(12) United States Patent
Rzezak et al.

(10) Patent No.: US 11,146,838 B2
(45) Date of Patent: Oct. 12, 2021

(54) CAPTIVE PORTAL BY PACKETCABLE MULTIMEDIA

(71) Applicant: Intraway R&D S.A., Montevideo (UY)

(72) Inventors: Leandro Rzezak, Buenos Aires (AR);
Martin Claro, Buenos Aires (AR);
Diego Ambuhl, Buenos Aires (AR)

(73) Assignee: Intraway R&D S.A., Montevideo (UY)

( * ) Notice: Subject to any disclaimer, the term of this patent is extended or adjusted under 35 U.S.C. 154(b) by 0 days.

(21) Appl. No.: 16/253,709

(22) Filed: Jan. 22, 2019

(65) Prior Publication Data

US 2019/0230398 A1 Jul. 25, 2019

Related U.S. Application Data

(60) Provisional application No. 62/619,965, filed on Jan. 22, 2018.

(51) Int. Cl.
*H04N 21/262* (2011.01)
*H04N 21/61* (2011.01)
*H04N 21/2543* (2011.01)
*H04L 29/08* (2006.01)
*H04L 12/24* (2006.01)

(52) U.S. Cl.
CPC ....... *H04N 21/26225* (2013.01); *H04L 41/00* (2013.01); *H04L 67/28* (2013.01); *H04N 21/2543* (2013.01); *H04N 21/6118* (2013.01)

(58) Field of Classification Search
None
See application file for complete search history.

(56) References Cited

U.S. PATENT DOCUMENTS

| | | | |
|---|---|---|---|
| 6,826,195 B1 * | 11/2004 | Nikolich | H04Q 11/0478 370/400 |
| 7,768,916 B2 * | 8/2010 | Davis | H04L 12/2801 370/230.1 |
| 8,266,266 B2 * | 9/2012 | Short | H04L 29/06047 709/223 |
| 9,027,063 B2 * | 5/2015 | Fickle | G06Q 10/10 725/118 |

(Continued)

FOREIGN PATENT DOCUMENTS

| | | |
|---|---|---|
| EP | 3270598 | 1/2018 |
| WO | 0119080 | 3/2001 |

(Continued)

OTHER PUBLICATIONS

Extended European Search Report dated Aug. 20, 2019 for EP19153129.

(Continued)

*Primary Examiner* — An Son P Huynh
(74) *Attorney, Agent, or Firm* — Peter A. Nieves; Sheehan Phinney; Bass & Green PA

(57) ABSTRACT

A system and method for operating a communication network having one or more cable modems. Operating the communication network may include displaying one or more messages to a subscriber and making temporary changes to Cable Modem Termination Systems in order to modify the availability of network resources for one or more cable modems assigned to a subscriber without requiring a rebooting of the one or more cable modems.

18 Claims, 4 Drawing Sheets

(56) References Cited

U.S. PATENT DOCUMENTS

| | | | |
|---|---|---|---|
| 10,178,421 B2* | 1/2019 | Thomas | H04N 21/2543 |
| 11,032,249 B2* | 6/2021 | Warrick | G06F 21/10 |
| 2004/0122956 A1* | 6/2004 | Myers | H04W 88/06 |
| | | | 709/228 |
| 2005/0078609 A1* | 4/2005 | Sharma | H04M 15/56 |
| | | | 370/254 |
| 2006/0062209 A1 | 3/2006 | Riley | |
| 2006/0149845 A1 | 7/2006 | Malin | |
| 2010/0312892 A1* | 12/2010 | Woundy | H04L 69/329 |
| | | | 709/226 |
| 2010/0332615 A1* | 12/2010 | Short | H04L 12/14 |
| | | | 709/217 |
| 2011/0142042 A1* | 6/2011 | Field | H04L 63/104 |
| | | | 370/390 |
| 2012/0011567 A1* | 1/2012 | Cronk | H04N 21/4753 |
| | | | 726/4 |
| 2012/0239809 A1* | 9/2012 | Mazumdar | G06Q 30/0246 |
| | | | 709/224 |
| 2012/0246553 A1* | 9/2012 | Ong | G06F 16/9535 |
| | | | 715/234 |
| 2014/0090030 A1* | 3/2014 | Ong | G06F 16/9577 |
| | | | 726/4 |
| 2014/0250471 A1* | 9/2014 | Guerra | H04N 21/43615 |
| | | | 725/82 |
| 2014/0344890 A1* | 11/2014 | Warrick | G06F 21/10 |
| | | | 726/1 |
| 2015/0295885 A1* | 10/2015 | Congdon | H04L 45/7453 |
| | | | 370/392 |
| 2015/0319193 A1* | 11/2015 | Chambers | H04L 63/10 |
| | | | 726/1 |
| 2017/0230515 A1* | 8/2017 | Velusamy | H04M 15/885 |
| 2018/0020000 A1* | 1/2018 | Rzezak | H04N 21/25816 |

FOREIGN PATENT DOCUMENTS

| | | | | |
|---|---|---|---|---|
| WO | WO-2009024182 A1 * | 2/2009 | | H04W 80/04 |
| WO | WO-2016013718 A1 * | 1/2016 | | G06Q 50/10 |

OTHER PUBLICATIONS

Bing B Ed-Kenichi Takahata et al; "Intelligent Policy Resource Management for Advanced Broadband Access Networks", Electrical and Computer Engineering, 2007, CCECE 2007, Canadian Conference on, IEEE PI, Apr. 1, 207.

Extended European Search Report for application 19153129, dated May 8, 2019.

* cited by examiner

```
┌─────────────────────────────────────────┐
│ Policy server reads new service flow policy │
└─────────────────────────────────────────┘
                                      302
                    │
                    ▼
┌─────────────────────────────────────────┐
│   Policy server commands CMTS to set    │
│    a gate between CM and CMTS    304    │
└─────────────────────────────────────────┘
                    │
                    ▼
┌─────────────────────────────────────────┐
│    CMTS sets gate, checks availability  │
│       And sets the service flow    306  │
└─────────────────────────────────────────┘
```

FIG. 3

```
┌─────────────────────────────────────────────────────────┐
│ Dear <subscriber_id>                                    │
│ This message is to remind you that your invoice for <invoice_amount> │
│ was due on <due_date>. Please make sure you pay to continue enjoying │
│ the service.                                            │
│ Regards,                                                │
│ Management                                              │
│                                                         │
│                                                    402  │
│                                                         │
└─────────────────────────────────────────────────────────┘
```

FIG. 4

CAPTIVE PORTAL BY PACKETCABLE MULTIMEDIA

CROSS-REFERENCE TO RELATED APPLICATIONS

We claim priority of U.S. Provisional Application No. 62/619,965 filed on Jan. 22, 2018 and titled "System and Method for Providing a Captive Portal by PacketCable Multimedia," incorporated herein by reference in its entirety.

FIELD OF THE INVENTION

An embodiment of the present invention relates generally to the means that a service provider can use to display temporary messages to its subscribers and also to temporarily change certain features of their broadband access, in both cases without requiring rebooting cable modems.

BACKGROUND OF THE INVENTION

A service provider, such as a cable operator, renders its services to its subscribers. The services include different subscription plans for accessing broadband Internet and telephony through a cable network.

Subscribers connect their computers, routers, voice-over-IP telephones and other devices to this network through the network terminals, called cable modems (CMs). Subscribers also connect telephones to multimedia terminal adapters (MTAs) often embedded together with a CM. Cable modems and MTAs are hardware devices which run software we call firmware. CMs and MTAs also make use of configuration settings which are provided by the service provider, and are loaded each time the devices boot and register to the service provider's network.

The service provider may, from time to time, want to present or display messages to one or more subscribers. For example, he may want to display marketing messages regarding a new service to the whole subscriber base, or perhaps only the residential subscribers, or he may want to send reminders to those subscribers whose bill is due in 3 days, or tell some of its subscribers that the service will be cancelled if they do not pay the outstanding balance in the next week. These are all examples of temporary messages that the service provider could want to show to the subscribers but then allow them to continue consuming the service. Alternatively, the service provider may want to display a so-called permanent message to a subscriber, and block or restrict the service. For example, if the bill for a subscriber has expired, then the service provider may want to temporarily block the subscriber from obtaining the broadband service and only display a "permanent" message asking the subscriber to pay the unpaid fees or contact the accounting department if there is an error. The service provider could, for example, allow access to a payment service and would remove the block and "permanent" message once the bill has been paid.

The service provider may need altering a mode or level of service or need to convey or display one or more messages, temporarily or permanently, to the subscriber. A change in service, or a message to be conveyed to or displayed to the subscriber, or similar, typically requires a rebooting of the cable modem, which is inconvenient.

SUMMARY OF THE INVENTION

Embodiments of the present invention include a method and a system to display a message in a network. The method of an embodiment of the present invention is directed to configuring a network, the method comprises: configuring a policy server to read a messaging policy; configuring the policy server to instruct a Cable Modem Termination System (CMTS) to create a gate for a cable modem included in the messaging policy; processing at either an edge router or the CMTS, an IP packet from a computer and redirecting the IP packet to a captive portal application, the IP packet for the edge router including a messaging tag in the type of service field in its header of the IP packet whereas the IP packet input to the CMTS is unmodified; configuring the captive portal application to receive a request from the computer; computing a MAC address of the cable modem connected to the computer; retrieving a policy associated with the MAC address; and generating a response to the request, the response including a webpage, the webpage having a message associated with the policy associated with the MAC address. It should be noted that the above step of processing at an edge router may include processing at multiple edge routers.

The system of an embodiment of the present invention includes a specially-programed processor configured to perform configuring a policy server to read a messaging policy; configuring the policy server to instruct a Cable Modem Termination System (CMTS) to create a gate for a cable modem included in the messaging policy; processing at either an edge router or the CMTS, an IP packet from a computer and redirecting the IP packet to a captive portal application, the IP packet for the edge router including a messaging tag in the type of service field in its header of the IP packet whereas the IP packet input to the CMTS is unmodified; configuring the captive portal application to receive a request from the computer; computing a MAC address of the cable modem connected to the computer; retrieving a policy associated with the MAC address; and generating a response to the request, the response including a webpage, the webpage having a message associated with the policy associated with the MAC address. It should be noted that the above step of processing at an edge router may include processing at multiple edge routers.

BRIEF DESCRIPTION OF THE DRAWINGS

Many aspects of the embodiments of the invention may be better understood with reference to the following drawings.

FIG. 3 shows a method of adding a service flow,

FIG. 4 shows a message displayed to a subscriber, and

DETAILED DESCRIPTION

Figure 1:
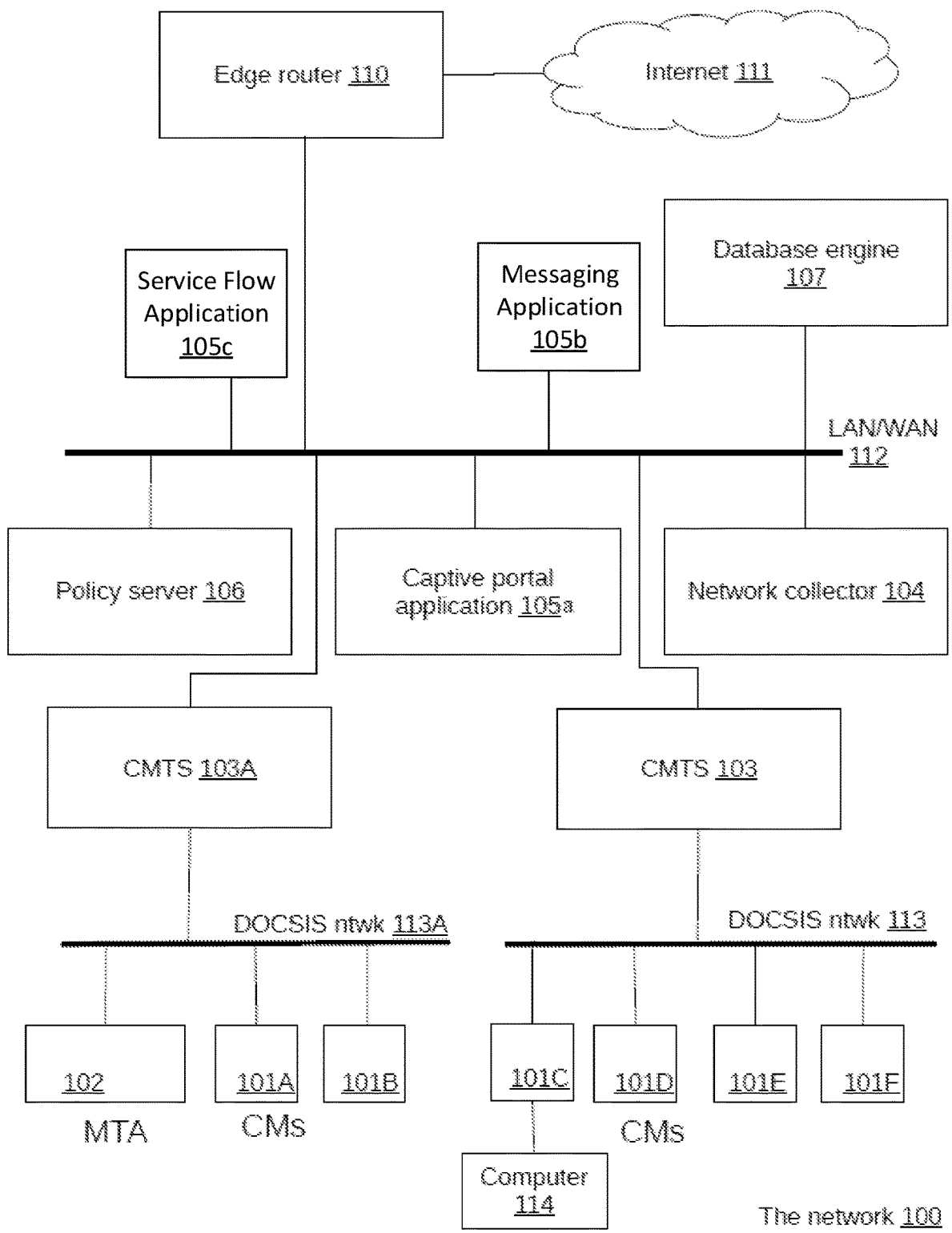
FIG. 1 shows an embodiment of a network.

Messages can be stored, hosted and displayed from within a Captive Portal application. Captive portal is a web page which is typically displayed to a new user before granting broader network access. Captive portals are typically used to present a landing/log-in page which may require authentication, payment, acceptance of EULA/Terms and Conditions of Use, etc., that both the host and the new user agree to abide by. One method for a service provider to ensure these messages and blocks are presented or displayed is to create a new DOCSIS configuration file specifically for the subscriber or subscribers. By changing the DOCSIS configuration, the service provider can force (HTTP or HTTPS)

requests originated from a cable modem (associated to a subscriber) to be redirected to a Captive Portal application (CPA for short). In order for this to work, the new DOCSIS configuration file for a cable modem could be a copy of the DOCSIS configuration file the cable modem was using before, only that the DNS server field, where DNS stands for domain name server, is replaced with at least one "spoofed" DNS server and traffic filters (e.g., IP filters) that do not allow DNS requests to other DNS service than that provided by the "spoofed" DNS servers. A spoofed DNS server is a DNS server which is configured to answer all DNS requests with the IP address of the captive portal (e.g., so that the request is directed to the captive portal, and the captive portal answers the request).

To apply this method, however, the cable modem (CM) of each of the intended recipients must be rebooted so that it is forced to download and use the new DOCSIS configuration file. The service provider can choose to force these cable modems to reboot, or he can wait until each of the subscribers or external events causes all cable modems to reboot. After any of these CM reboots, it downloads and starts using the new DOCSIS configuration. In particular, if the DNS was changed in the DOCSIS configuration to point to the spoofing DNS, then the configured DNS server answers every DNS request with the IP address of the captive portal. The captive portal, or captive portal application, then takes care of resolving the messaging process.

Moreover, the new DOCSIS configuration may also include more drastic measures to ensure that the subscriber only connects to the captive portal application, like traffic filters rules which would enforce that only specific connections are allowed.

This method for sending messages to subscribers or blocking their access to the service by making changes to the DOCSIS configuration is troublesome for the subscriber and for the service provider for several reasons. First, if a subscriber has his cable modem rebooted without any warning, he may lose work, or he could have a phone conversation dropped if the service provider chooses to force the reboot of the MTA. On the other hand, if the service provider must wait for the CM to be rebooted by a subscriber or external event, then he cannot control when this happens. This could have a negative impact to the business and hence be unwanted by the service provider.

Second, assume that in order to send a message to a subscriber, the service provider changes the DOCSIS configuration of the subscriber's cable modem and the captive portal shows this message to the subscriber. Let "configuration A" denote the original configuration and "configuration B" denote the modified (which includes the redirection to the Captive Portal application). Note that the provider needs to enforce two configuration changes: one from A to B, and then another change back to the original configuration once the message has been delivered.

Third: what is more, when a modem reboots it interacts with the Cable Modem Termination System (CMTS), DHCP servers, TFTP servers and other components. Hence, there is a performance penalty to the cable provider's network infrastructure that could be quite important. For example, if the service provider needs to send a message with the monthly bill to 30% of its subscriber base, the impact of all these cable modems rebooting is huge.

A second set of problems comes from the service provider wanting to make traffic modifications. We explain.

Service flows, defined as part of the DOCSIS protocol, are used to configure traffic quality-of-service parameters including control, priority, bandwidth, and scheduling type (for upstream). Broadband subscriptions typically place explicit caps to the upstream and downstream bit rates (speeds). That is, the traffic from cable modem to the interne and back cannot exceed the upstream and downstream rates respectively. These rates are configured in the cable modem through at least a pair of service flows: an upstream flow and a downstream flow, where the downstream (respectively downstream) flow establishes the maximum upstream (respectively downstream) bitrate that the CMTS allows.

Service providers of broadband services could want to temporarily modify the downstream or upstream flows assigned to a subscriber. This could be a new service offered to a subscriber wanting to upload massive amounts of content or a subscriber that needs to download, say, a huge computer program or media content.

In a conventional setting, the service provider may be able to create a DOCSIS configuration file that allows him to modify downstream and/or upstream flows. In order for this to work, the new DOCSIS configuration file for the cable modem would include modifications (to the older configuration) that would enforce the new service flows. The cable modem must be rebooted for this new configuration to be loaded, and the cable modem must be rebooted again for the original configuration to return.

The same problems described for the message delivery in the previous paragraphs apply: cable modems must be rebooted, increase in infrastructure traffic, et cetera. Moreover, assume a subscriber starts with "configuration A", temporarily activates or pays for a better service for a temporary or trial period that is delivered through a "configuration B" and that the temporary period is over. At this point, the provider should replace configuration B with configuration A and to do this either the service provider reboots the cable modem so that the service is downgraded to the original speeds or he waits until the subscriber reboots the cable modem himself. In the case of service flows, as opposed to what happens with messaging, the subscriber's incentive is not to reboot the cable modem and continue using the improved rates for free.

An embodiment of the present invention provides a system and method for making temporary modifications to the configuration of components of the network infrastructure of the service provider in order to display messages, make configuration changes and in particular redirect requests and add or remove service flows, in cable modems and MTAs.

A private network is deployed by or for the service provider. FIG. 1 is a schematic diagram illustrating an exemplary private network 100 having components described below.

One or more Cable modems (101A-101F) and MTAs (102) connect to a set of Cable modem termination systems (CMTS for short) 103 and 103A, for example, through coaxial or fiber cable. A CMTS is a broadband router that converts the signals of CMs and MTAs to the IP protocol and into an (IP) router. This CMTS (103 or 103A)—IP router pair (CMTS may include IP router) connects cable modems to the other equipment in the network. A CMTS 103 underlying an embodiment of the invention may be configured to handle PacketCable multimedia (PCMM) and in particular Type of Service (TOS) headers. PacketCable is a technology specification laid out by the industry consortium CableLabs for using IP networks to deliver multimedia services, such as IP telephony, conferencing, interactive gaming, etc., on a cable TV network.

The network may include a database engine 107 or other systems which allow the storage, modification and querying of tables, which may be implemented as a standard SQL database, or may be replaced by a filesystem which may store tables, containing different tables including but not limited to a policies table, a devices table, a subscriptions and billing table and a messages table. The devices table includes an inventory of all of the cable modems (and MTAs) in the network, their MAC address paired with at least the following information: the subscriber they may be associated with, and the IP address of the CMTS they connect to. It may additionally contain, or point to a table containing, the subscription plans and in particular the upwards and downwards bitrate bandwidths that this plans provide.

The above-mentioned devices table may be maintained by another device, not essential for an embodiment of the invention. For example, a network collector 104 (NC for short) may be required. The NC 104 is a server located in the same local area network as a CMTS, e.g., this is network 112 in FIG. 1. The network collector is responsible for keeping updated information of the network and in particular a devices table (in the database engine 107) which has a list of all the cable modems (101A through 101F), the IP address of the CMTS they connect to, their MAC address and the subscription ID they may be associated with.

It may be noted that in the present disclosure "captive portal" and "captive portal application" may be used interchangeably.

One or more applications or web services, hosted each in one or different web servers that provide the following services and functionality. These functionalities may be covered by one or more web applications as follows. A captive portal application 105a is an application, hosted in a web server, which controls displaying the messages to one or more subscribers. A messaging application 105b allows a user (acting on behalf of the service provider) to create messages and message templates. A message, whether it is permanent or temporary, includes a list of recipients the validity starting and ending time (if applicable), and other parameters that are described later in more detail. When this happens the messaging application creates a messaging policy and inserts it into the database. A service flow application 105c allows a user to define new (temporary) service flows for subscribers, includes whether it relates to a downwards service flow or an upwards service flow, a bitrate, a starting time and an ending time. When this happens the service flow application creates a service flow policy and inserts it into the database. It should be noted that there may be certain types of policies that may be preceded by messaging or service flow.

A policy server 106 reads policies from the policies table, includes logic to query tables for desired information that may be missing in the policy, and interacts with the CMTS and network to implement these policies. The information may be required by the CPA or even the policy server. The CPA or the policy server may each connect to the database engine and may query for information missing in a policy. The policy server may need to interact with the CPA, the CMTS, or additional components/modules to implement one or more policies. Polices may either be messaging policies or service flow policies.

An edge router 110 may be a network router that the service provider uses to connect its infrastructure to the internet. The router may or may not implement policy-based routing by ToS or DiffServ (Type of Service and DiffServ are entries in the header of an IP packet). The policy-based routing may be a technique used to make decisions based on policies set by the network administrator.

Messaging

Figure 2:
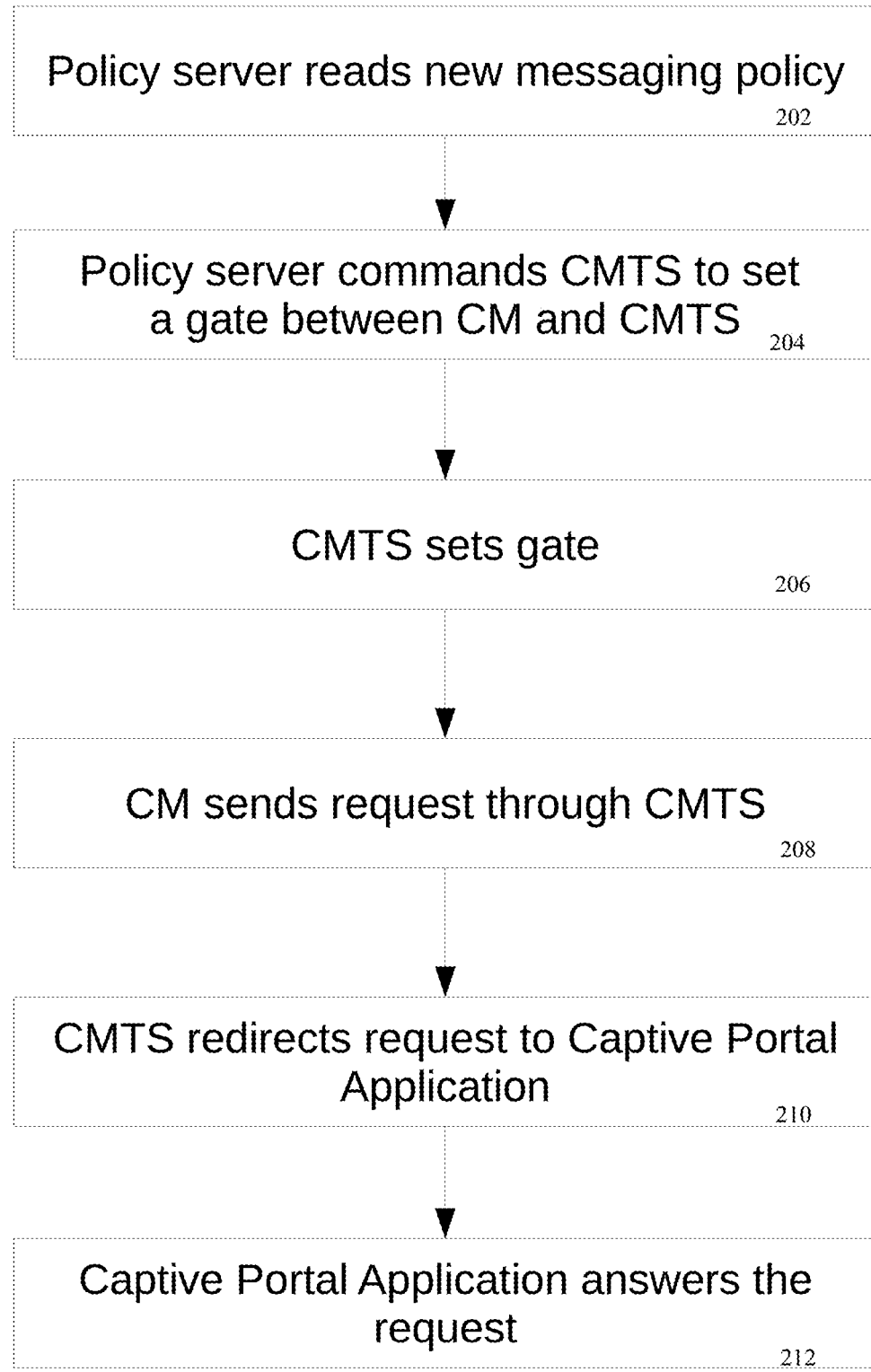
FIG. 2 shows a method of displaying a message.

FIG. 2 is a block diagram providing a first embodiment of the present invention. A messaging policy may be created and stored. For example, the policy may be inserted into a policies table in the database engine 107 or another form of storage. The messaging policy includes a set of recipients, the contents of the message, and optionally, additional parameters as described below.

An exemplary specification of a messaging policy may contain a cable modem (or MTA) identifier, including but not limited to, the MAC address of the cable modem and the message content (or a reference to the message), or a reference to a template (if the message is to be constructed out of a template). Additional message parameters(e.g., variables in the messaging policies table) may be: whether the message is removable or permanent, in case it is removable, a start time and ending time (else this field may be ignored), in case it is removable, whether it has been read or not, in case the message is constructed out of a template, then a list of the variables or parameter values (examples of variables or parameters may include, but are not limited to: subscription_id, due_date and amount_due. Any template may contain a number of parameter values and when a template is instantiated, the underlying messaging policy may need to provide the values for these parameter values), fields to update the synchronization status of the policy with the CMTS that may be updated by the policy server, and other content which may be retrieved from the messaging application when the message needs to be displayed including but not limited to templates (content and template parameters), parameters for querying the database management system.

The policy server 106 periodically queries the policies table in the database engine 107 for policies, it reads (block 202) policies, removes policies, performs maintenance actions, and implements policies as described below.

Policies that are no longer valid or applicable may be removed. That is, the policy server may remove messaging policies whose endtime is in the past (as compared to its own clock). It may remove all policies associated to removable messages that are marked as read. It may remove all messaging policies marked as invalid. The valid or invalid boolean may be another variable in the policies table, or this information may be conveyed in some other way. An embodiment of the policy server may determine the validity of a messaging policy in several ways as follows. When the policy server deems a policy invalid, the policy server a) deletes the policy from the policies table, and b) reads the MAC address of the cable modem from the policy and sends a command to the CMTS to remove the policy.

There may be at least two validity check procedures. First, when the policy server reads a policy (e.g., that the policy server polled from the policies table), and the policy has an ending time, then the policy server will compare ending time with current time and decides the policy as invalid if the ending time is before the current time Second, the captive portal application can modify a messaging policy, thus rendering it invalid. This happens, for example, when a messaging policy is for a temporary message, the captive portal displays the message and the subscriber acknowledges reading it (e.g., in the webpage), and hence the captive portal application modifies the policy conveying that the message has been read. Also, messaging policies underlying permanent messages may be rendered invalid. This again, happens after the captive portal application interacts with subscribers as it happens in the case of unpaid bills that we describe in more detail later. In this case, the captive portal application modifies the messaging policy, e.g., there is an entry in the messaging policies table that says if the policy is valid or invalid.

After receiving a new messaging policy (block 204), the policy server sends a command to the CMTS (103) so that it creates a gate between itself and this cable modem. When the gate is created between a cable modem and the CMTS (103), the gate filters some IP packets of the cable modem in the messaging policy, for example, those targeting ports 80 and 443, but could be other filters, and for those packets the "type of service" or diffserv field in the IP header is replaced with the "messaging tag" mentioned below.

It should be noted that herein, the terms tag and messaging tag are interchangeable. In addition, the terms type of service (without diffserv), TOS, and type of service with diffserv are interchangeable herein.

A gate, or PacketCable gate, is a logical entity in the CMTS that establishes certain properties between the CM and the CMTS. In other words, a gate is a logical entity that allows the CMTS to make further logical constructs. For example, packets with one kind of gate and targeting ports 80 or 443 are redirected . . . and with another kind of gate, are used for ensuring a service flow is authorized. The gate is typically used for ensuring that a service flow is authorized for the requested quality-of-service (QoS). The policy server may require the MAC address of this cable modem or other information, which it may retrieve from the database engine using the references and information in the policy. Once this gate is created (block 206), all the traffic out of this CM (block 208) may be redirected (block 210) through this gate. Specifically, the ToS/DiffServ field in the header of these IP packets may be overwritten with a specific value: the "messaging tag" that may be recognized by other parties in the network, e.g., by the edge router (110). The IP packet may contain the messaging tag in the Type of Service/DiffServ field of its header.

Figure 5:
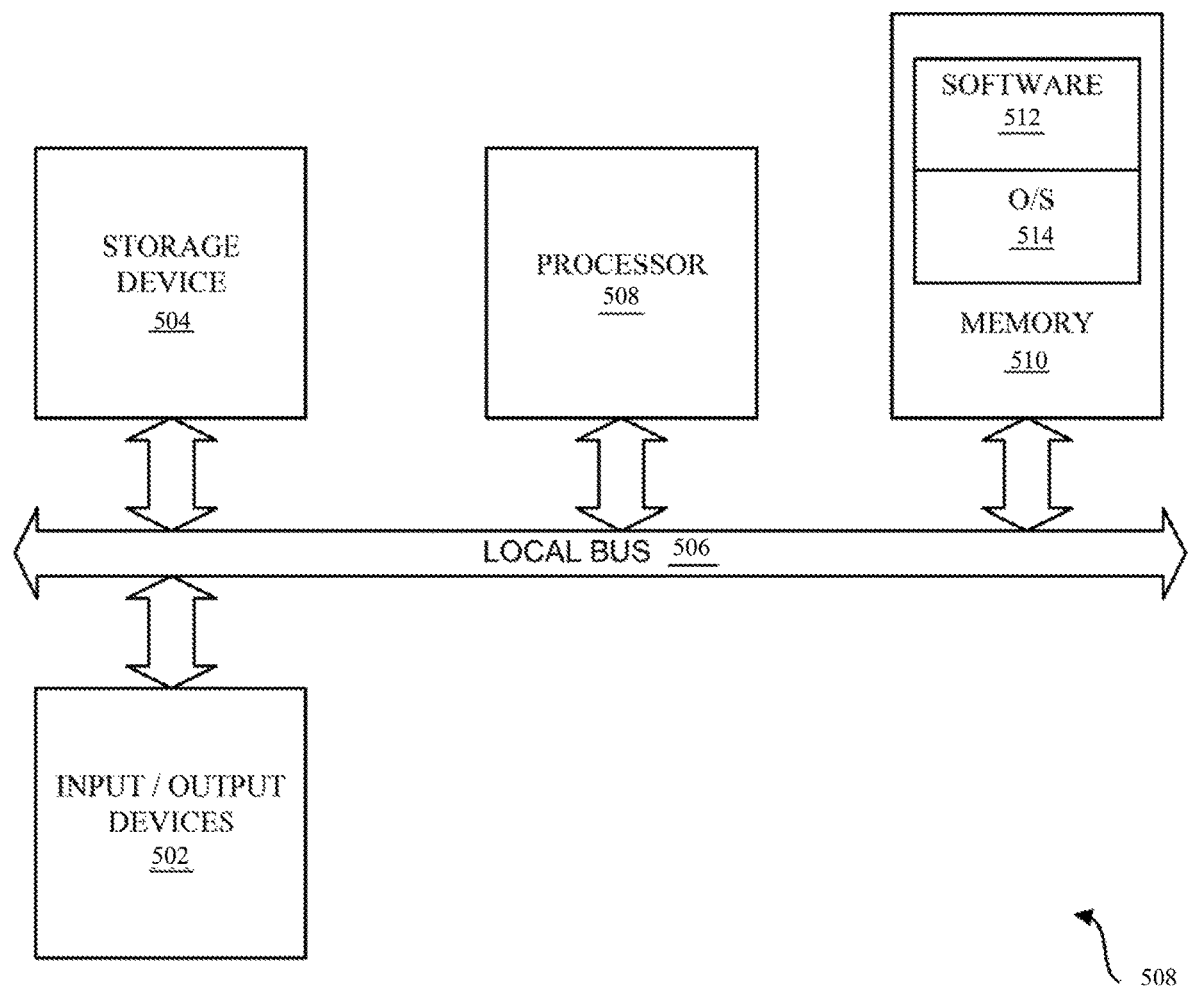
FIG. 5 shows a computing device having input/output devices, storage device, local bus, processor and memory having software and operating system.

When an IP packet from the cable modem (101C) reaches the CMTS (103) and targets ports 80 or 443 the CMTS (103) applies the gate and consequentially modifies the header of this IP packet adding the messaging tag. This may happen for example, when a web browser, running in a computing device (114), behind the cable modem (101C) makes a request, the cable modem sends the request through the CMTS (113), and this CMTS applies the gate: each IP packet that forms the request (originating from this personal computer and destined to ports 80 or 443) has the Type of Service field in its header replaced by the messaging tag by the CMTS. As is known to those having ordinary skill in the art, a computing device may be one or more of many different devices including, but not limited to, a smart phone, smart TVs, tablets, general computer (such as shown in FIG. 5), and other devices that consume broadband internet behind a cable modem.

According to the present system and method, the packet may be redirected to the server hosting the captive portal application by any of two means. First, if the edge router implements policy-based routing, then once an IP packet reaches the edge router, the edge router may read the header, notice that it includes the messaging tag in the type of service (ToS) field, and redirect the IP packet as instructed in its routing policies. Second, if the edge router does not implement policy-based routing, the redirection may be configured and implemented at the CMTSs (103, 103A), that is, by the IP router in the CMTS. In this case, the service provider may configure the network so that the CMTS can connect to the captive portal application. This may be achieved, for example, by configuring a virtual private network between CMTSs and the web server hosting the captive portal application. Once configured, the CMTS may redirect all of the IP packets which have the messaging tag in the ToS field of their header and destined to ports 443 and 80 to the captive portal application. Ports 80 and 443 are exemplary, other IP packet filtering rules may apply.

IP packets may be redirected to the server hosting the captive portal application. According to the OSI stack, a request (at the application level) is one or more IP packets at the network level. The request may be received at the CPA (block 212).

When the captive portal application (105*a*) receives a request, it may extract the IP address of the originating computer and check if there are cached answers for this IP address. Else, it reads the IP address of the computer (114) and that of the CMTS (103) that connects to it. Using this information, the CPA may retrieve the messages assigned to this cable modem as follows.

The CPA queries the CMTS with the IP address of the computer to get the IP address of the cable modem this computer connects to. Next, the CPA may get the MAC address of the cable modem and the underlying subscription ID by querying the database engine (107). It may then retrieve the messaging policies associated with this MAC address from the database engine, and from each policy extract the content of the messages.

Recall that in each messaging policy, either the message content may be included or a reference to the said content may be included. If the message content is not included in the messaging policy, then the messaging policy may either include a reference to the message content or to a template. In the first case, it may use the reference to retrieve the content (e.g., from the database engine), and in the latter case it first uses the reference to retrieve the content (again from its cache or from the database engine if unavailable at the cache), it extracts the parameters from the messaging policy, and finally assembles the instantiated template. FIG. 4 shows an example. The variables subscriber id, invoice amount and due date in FIG. 4 (block 402) may be replaced with the parameters included in the messaging policy.

The message content together with the IP address of the cable modem and the time when these were retrieved may be cached in the CPA's memory for future reference.

Next, the captive portal application answers to the request with a webpage that encodes the message content. Generally speaking, the CPA includes logic to deliver the message in a pre-specified format in the HTML (language) so that the web browser may render the message.

If the message is removable, then it may be marked as delivered (within the messaging policy) once delivered. For example, the webpage including the message may also contain a link which, when clicked, makes a request at the CPA and the CPA thereafter marks the message as read in the policies table. The captive portal application may send a message to the policy server asking it to remove the underlying policy from the policies table, and in turn, the policy server may then command the CMTS to remove the gate with the subscriber's cable modem. Note that the policy server may first, before removing a gate, check if there is at least one valid messaging policy and thus decide not to remove the gate. It should also be noted that the CPA can optionally remove the policy himself.

As a result, the policy server may remove the policy and gate, this giving back full subscription capabilities to the subscriber, and without rebooting the CM. In other words, the modifications may be made at the CMTS, hence no CM configuration change is required, obviating a need to reboot the CM.

On the other hand, if the message is not removable, it is permanent (e.g., when a subscriber has not paid a bill, and the service provider has decided to terminate the service and redirect the subscriber to a permanent message in the captive portal application asking him to pay what is due). In this case, the captive portal application may include a message and link to the payment application, where the subscriber may select means for cancelling the outstanding debt. After the payment application confirms the payment to the captive portal application, the captive portal application may send a message to the policy server asking it to remove the underlying policy from the policies table, it may also mark the messaging policy as invalid, and in turn, the policy server may then command the CMTS to remove the gate with the subscriber's cable modem. As a result, the policy server removes the policy and gate, thus giving back full subscription capabilities to the subscriber without rebooting the CM—with all the benefits that this implies. Note that the policy server may first, before removing a gate, check if there is at least one valid messaging policy and thus decide not to remove the gate.

Traffic Changes

A different embodiment of this invention includes a system and method where a service provider may modify upstream or downstream bitrate caps for a subscriber during a given period of time and without asking the subscriber to reboot his cable modem.

A service flow is part of the configuration of a cable modem. More broadly, a service flow controls priority, bandwidth and scheduling type. A configuration file may include two (one upwards one downwards) or more service flows for the same cable modem.

A service flow policy may be created and stored. For example, the service flow policy may be inserted in the policies table. The service flow policy includes a cable modem identifier, including but not limited to its MAC address, a start time and end time of the policy's validity, whether the policy is for an upstream or downstream service flow, and the new (bandwidth) rate.

Periodically, the policy server may poll for the policies table (block 302) for new policies. When this is a service flow policy, the policy server may ignore it if the current time is before the policy's starting time of after its end time. Else, the policy server performs one or more of the following, not necessarily in that order. First, obtain the cable modem's (or MTA's) MAC address. Either it is included in the policy or it is obtained from the database using the reference included in the policy. Second, the policy server commands the CMTS (block 304) to create a gate between CMTS and cable modem or MTA. The gate includes the service flow with the parameters extracted from the service flow policy. Third, the CMTS receives the new service flow, checks that the traffic is available and installs the service flow (block 306) in the cable modem.

Once the service flow is installed, the cable modem may use it. A cable modem may have two or more service flows. If it has more than one upstream service flow (respectively downstream), the CMTS, e.g., for example the one with higher bitrate, or the one underlying the gate, may have higher priority than the one in the CMTS's and CM's configuration.

When a service flow policy is marked as invalid, e.g., because the ending time in the service flow policy is before the current time of the policy server, then the policy server marks the service flow policy as invalid, asks the CMTS to remove the gate, who in turn removes the underlying service flow from cable modem and removes the gate.

A messaging policy of the removable type, having an ending time earlier than the policy server current time is deemed invalid, therefore removed.

Management

The policies table may be populated by several means. In one embodiment of this invention, a messaging application may be used as follows. A representative for the service provider interacts with the messaging and service flow application (105c) either manually or through an API (application program interface). The representative may create temporary changes in traffic, removable messages or permanent messages to one or more subscribers.

The service provider may define messages the service provider wants one or more subscribers to receive. These could be marketing messages describing offers and new subscription plans, the receipts for the upcoming subscription period, or any arbitrary message.

For example, the service provider may create a new message from a simple messages webpage. The webpage displays a form from which he selects one or more message recipients out of a subscribers table (e.g., using their name, or their location, or any number of criteria), writes the message content in a text editor, and selects other parameters from a menu displayed within the form. Once done, the service provider saves this, and the messaging application automatically encodes a messaging policy and inserts it into the database engine.

The messaging application could also allow a scheduling functionality. For example, the messaging application may receive an order to assign messages to a specific date and optionally when these messages should be removed, then when the date and time approach, it may query for their subscription ID, and assign to each a message (constructed out of a template) and automatically remove the message when the removal date and time approach.

When the service provider wants to modify the upstream or downstream rates for a subscriber, the service provider goes to the service flows menu in the messaging and service flow application (105b 105c) and enters the following information: the subscription ID for the subscriber, the start time and end time of the policy's validity, whether this is an upstream or downstream service flow, and the new (bandwidth) rate. Once saved, a service flow policy is created and inserted into the database engine.

The method of an embodiment of the present invention is directed to configuring a network, the method comprises: configuring a policy server 106 to read a messaging policy (block 202, FIG. 2); configuring the policy server 106 to instruct (block 204, FIG. 2) a Cable Modem Termination System (CMTS, 103 103A) to create a gate (block 206, FIG. 2) for a cable modem (101A-101F) included in the messaging policy; processing at either an edge router 110 or the CMTS (103 103A), an IP packet from a computer and redirecting the IP packet to a captive portal application 105a (block 210), the IP packet for the edge router 110 including a messaging tag in the type of service field in its header of the IP packet whereas the IP packet input to the CMTS (103 103A) is unmodified; configuring the captive portal application 105a to receive a request (block 208 210) from the computer; computing a MAC address of the cable modem (101A-101F) connected to the computer 114 (there may be more computers in addition to 114 of FIG. 1); retrieving a policy associated with the MAC address; and generating a response to the request (block 212), the response including a webpage, the webpage having a message associated with the policy associated with the MAC address. It should be noted that the above step of processing at an edge router 110 may instead include processing at multiple edge routers.

The method may further include configuring the captive portal application 105a to instruct the policy server 106 to remove the messaging policy from a policies table when the messaging policy is not valid any longer; and configuring the policy server 106 to instruct the CMTS (103 103A) to remove the gate. Note that the policy server may first, before removing a gate, check if there is at least one valid messaging policy and thus decide not to remove the gate.

The network may include the computer 114, the cable modem (101A-101F), a database engine (107), the CMTS (103 103A), the policy server 106, and the captive portal application 105a. The method may further include configuring the captive portal application 105a to instruct the policy server 106 to remove a messaging policy of permanent type once an outstanding bill is paid.

It should be noted that, herein, messages of the temporary and removable type are the same.

The method may further include: upon receiving a messaging policy by a captive portal application 105a of permanent type, configuring the captive portal application 105a to learn from a payment application that an outstanding bill associated with the messaging policy has been paid; configuring the captive portal application 105a to instruct the policy server 106 to remove the messaging policy from the policies table; and configuring the policy server 106 to instruct the CMTS (103 103A) to remove the gate. Note that the policy server may first, before removing a gate, check if there is at least one valid messaging policy and thus decide not to remove the gate.

The method may further include configuring the policy server 106 to remove a policy not needed any longer. The method may further include a subscriber paying an outstanding bill in response to a message having a payment option; configuring a captive portal 105a application to detect a payment by the subscriber paying the outstanding bill; and configuring the captive portal application 105a to remove the policy associated with the MAC address.

The method may further include configuring the captive portal application 105a to communicate with the policy server 106 to remove the messaging policy for a temporary message that has been read.

An embodiment of a method of modifying an information in a network may include: configuring a policy server 106 to read at least one service-flow policy; configuring the policy server 106 to instruct a Cable Modem Termination System (CMTS) (103 103A) to create a gate for a cable modem (101A-101F) included in the service-flow policy, the gate having a service-flow and a parameter included in the at least one service-flow policy; and the CMTS (103 103A) receiving the service-flow, verifying an availability of traffic, and installing the service-flow in the cable modem (101A-101F).

In the method of modifying the information in network, the network includes a computer 114, the cable modem (101A-101F), the database engine 107, the CMTS (103 103A), the policy server 106, and a captive portal application 105a.

FIG. 5 shows an embodiment of a system of the present invention including computing device 500 having input/output devices 502, storage device 504, local bus 506, specially-programmed processor 508 and memory 510 having software 512 and operating system 514. The specially-programmed processor 508 is configured to perform, employing the steps shown in FIG. 2, the following: configuring a policy server to read a messaging policy; configuring the policy server to instruct a Cable Modem Termination System (CMTS) to create a gate for a cable modem included in the messaging policy; processing at either an edge router or the CMTS, an IP packet from a computer and redirecting the IP packet to a captive portal application, the IP packet for the edge router including a messaging tag in the type of service field in its header of the IP packet whereas the IP packet input to the CMTS is unmodified; configuring the captive portal application to receive a request from the computer; computing a MAC address of the cable modem connected to the computer; retrieving a policy associated with the MAC address; and generating a response to the request, the response including a webpage, the webpage having a message associated with the policy associated with the MAC address. It should be noted that the above step of processing at an edge router may include processing at multiple edge routers.

The system may be further configured to enable the captive portal application 105a to instruct the policy server 106 to remove the messaging policy from a policies table when the messaging policy is not valid any longer; and enable the policy server 106 to instruct the CMTS (103 103A) to remove the gate. Note that the policy server may first, before removing a gate, check if there is at least one valid messaging policy and thus decide not to remove the gate.

The system may include a network, wherein the network may include the computer 114, the cable modem (101A-101F), a database engine 107, the CMTS (103 103A), the policy server 106, and the captive portal application 105a.

The system may be further configured to enable the captive portal application 105a to instruct the policy server 106 to remove a messaging policy of permanent type once an outstanding bill is paid.

The system may be further configured to perform: upon receiving a messaging policy by a captive portal application 105a of removable type, enabling the captive portal application 105a to learn from a payment application that an outstanding bill associated with the messaging policy has been paid; enabling the captive portal application 105a to instruct the policy server 106 to remove the messaging policy from the policies table; and enabling the policy server 106 to instruct the CMTS (103 103A) to remove the gate. Note that the policy server may first, before removing a gate, check if there is at least one valid messaging policy and thus decide not to remove the gate.

The system may be further configured to perform enabling the policy server 106 to remove a policy not needed any longer.

The system may further include a subscriber paying an outstanding bill in response to a message having a payment option; configuring a captive portal application 105a to detect a payment by the subscriber paying the outstanding bill; and configuring the captive portal application 105a to remove the policy associated with the MAC address.

The system may be further configured to perform: enabling the captive portal application 105a to communicate with the policy server 106 to remove the messaging policy for a temporary message that has been read.

A system for modifying an information in a network 100, may have a specially-programmed processor 508 configured to perform: enabling a policy server 106 to read at least one service-flow policy; enabling the policy server 106 to instruct a Cable Modem Termination System (CMTS) (103 103A) to create a gate for a cable modem (101A-101F) included in the service-flow policy, the gate having a service-flow and a parameter included in the at least one service-flow policy; and the CMTS (103 103A) receiving the service-flow, verifying an availability of traffic, and installing the service-flow in the cable modem (101A-101F).

In the system, the network 100 may include a computer 114, the cable modem (101A-101F), the database engine 107, the CMTS (103 103A), the policy server 106, and a captive portal application 105a.

What is claimed is:

1. A method of configuring a redirection of data traffic of a cable modem in a cable-operated network comprising an edge router connecting the cable-operated network to an internet, the method comprising:
   providing a captive portal application on a web server in the cable-operated network configured to provide a webpage;
   configuring a policy server in the cable-operated network to read a messaging policy;
   after receiving the message policy, configuring the policy server to instruct a Cable Modem Termination System (CMTS) in the cable-operated network to create a gate between the cable modem and the CMTS, the gate is configured to filter an IP packet for the cable modem included in the messaging policy, further comprising the steps of:
   receiving by the CMTS via the cable modem a request comprising the IP packet and a header of the IP packet from a computer connected to the cable modem;
   adding, by the CMTS, a tag in the header of the IP packet, wherein the IP packet input to the CMTS is unmodified;
   in response to the edge router implementing policy-policy based routing, redirecting by the edge router, the IP packet to the captive portal application based upon the tag in the header of the IP packet;
   in response to the edge router not implementing the policy-based routing, configuring, by a service provider, a virtual private network between to CMTS and the web server and redirecting, by the CMTS, the IP packet to the captive portal application based on the tag in the header of the IP packet;
   configuring the captive portal application to receive the request from the computer;
   retrieving a policy associated with a MAC address of the cable modem connected to the computer; and
   generating to the computer a response to the request, the response including the webpage having a message associated with the policy associated with the MAC address.

2. The method of claim 1, further comprising: configuring the captive portal application to instruct the policy server to remove the messaging policy when the messaging policy is not valid any longer; and
   configuring the policy server to instruct the CMTS to remove the gate.

3. The method of claim 2, further comprising: configuring the captive portal application to instruct the policy server to remove a messaging policy of permanent type once an outstanding bill is paid.

4. The method of claim 2, further comprising:
   upon receiving a messaging policy by a captive portal application of removable type, configuring the captive portal application to learn from a payment application that an outstanding bill associated with the messaging policy has been paid;
   configuring the captive portal application to instruct the policy server to remove the messaging policy; and
   configuring the policy server to instruct the CMTS to remove the gate and on receiving a confirmation of the gate removed, the policy server causing a removal of the messaging policy from the policies table.

5. The method of claim 1, wherein the cable-operated network comprises the computer, and a database engine.

6. The method of claim 1, further comprising: configuring the policy server to remove a policy not needed any longer.

7. The method of claim 1, further comprising:
   a subscriber paying an outstanding bill in response to a message having a payment option;
   configuring a captive portal application to detect a payment by the subscriber paying the outstanding bill; and
   configuring the captive portal application to remove the policy associated with the MAC address.

8. The method of claim 1, further comprising: configuring the captive portal application to communicate with the policy server to remove the messaging policy for a temporary message that has been read.

9. The method of claim 1, wherein messaging policy comprises: the MAC address of the computer connected to the cable modem; and the message associated with the policy associated with the MAC address.

10. A system for redirection of data traffic of a cable modem in a cable-operated network comprising an edge router connecting the cable-operated network to an internet, the system having a specially-programmed processor configured to perform:
    providing a captive portal application on a web server in the cable-operated network configured to provide a webpage;
    configuring a policy server in the cable-operated network to read a messaging policy;
    after receiving the message policy, configuring the policy server to instruct a Cable Modem Termination System (CMTS) in the cable-operated network to create a gate between the cable modem and the CMTS, the gate is configured to filter an IP packet for the cable modem included in the messaging policy, further comprising the steps of:
    receiving by the CMTS via the cable modem a request comprising the IP packet and a header of the IP packet from a computer connected to the cable modem, wherein the IP packet input to the CMTS is unmodified;
    adding, by the CMTS gate, a tag in the header of the IP packet;
    in response to the edge router implementing policy-policy based routing, redirecting by the edge router, the IP packet to the captive portal application based upon the tag in the header;
    in response to the edge router not implementing the policy-based routing, configuring by a service provider, a virtual private network between to CMTS and the web server, and redirecting by the CMTS, the IP packet to the captive portal application based on the tag in the header of the IP packet;
    configuring the captive portal application to receive the request from the computer;
    retrieving a policy associated with a MAC address of the cable modem connected to the computer; and
    generating to the computer a response to the request, the response including the webpage having a message associated with the policy associated with the MAC address.

11. The system of claim 10, wherein the processor is further configured to perform: enabling the captive portal application to instruct the policy server to remove the messaging policy when the messaging policy is not valid any longer; and enabling the policy server to instruct the CMTS to remove the gate and on receiving a confirmation of the gate removed, the policy server causing a removal of the messaging policy from a policies table.

12. The system of claim 11, wherein the processor is further configured to enable the captive portal application to instruct the policy server to remove a messaging policy of permanent type once an outstanding bill is paid.

13. The system of claim 11, wherein the processor is further configured to perform: upon receiving a messaging policy by a captive portal application of removable type, enabling the captive portal application to learn from a payment application that an outstanding bill associated with the messaging policy has been paid; enabling the captive portal application to instruct the policy server to remove the messaging policy; and enabling the policy server to instruct the CMTS to remove the gate and on receiving a confirmation of the gate removed, the policy server causing a removal of the messaging policy from the policies table.

14. The system of claim 10, wherein the cable-operated network comprises the computer, and a database engine.

15. The system of claim 10, wherein the processor is further configured to perform enabling the policy server to remove a policy not needed any longer.

16. The system of claim 10, further including: a subscriber paying an outstanding bill in response to a message having a payment option; configuring a captive portal application to detect a payment by the subscriber paying the outstanding bill; and configuring the captive portal application to remove the policy associated with the MAC address.

17. The system of claim 10, wherein the processor is further configured to perform enabling the captive portal application to communicate with the policy server to remove the messaging policy for a temporary message that has been read.

18. The system of claim 10, wherein messaging policy comprises: the MAC address of the computer connected to the cable modem; and the message associated with the policy associated with the MAC address.

* * * * *